(12) United States Patent
Heider et al.

(10) Patent No.: US 11,534,864 B2
(45) Date of Patent: Dec. 27, 2022

(54) METHOD FOR CONNECTING TWO COMPONENTS AND COMPONENT COMPOSITE

(71) Applicant: Robert Bosch GmbH, Stuttgart (DE)

(72) Inventors: Andreas Heider, Stuttgart (DE); Reiner Ramsayer, Rutesheim (DE)

( * ) Notice: Subject to any disclaimer, the term of this patent is extended or adjusted under 35 U.S.C. 154(b) by 31 days.

(21) Appl. No.: 17/057,577

(22) PCT Filed: May 27, 2019

(86) PCT No.: PCT/EP2019/063598
§ 371 (c)(1),
(2) Date: Nov. 20, 2020

(87) PCT Pub. No.: WO2019/242995
PCT Pub. Date: Dec. 26, 2019

(65) Prior Publication Data
US 2021/0205926 A1    Jul. 8, 2021

(30) Foreign Application Priority Data

Jun. 20, 2018   (DE) .......................... 102018209981.2

(51) Int. Cl.
*B23K 26/08*   (2014.01)
*B23K 26/20*   (2014.01)
(Continued)

(52) U.S. Cl.
CPC .......... *B23K 26/244* (2015.10); *B23K 26/037* (2015.10); *B23K 26/083* (2013.01);
(Continued)

(58) Field of Classification Search
CPC .. B23K 26/08–0821; B23K 26/20–206; B23K 26/21–211; B23K 26/22;
(Continued)

(56) References Cited

U.S. PATENT DOCUMENTS

2005/0230371 A1   10/2005   Kutsuna et al.
2011/0168682 A1*   7/2011   Hagihara ............. B23K 26/244
                                                             219/121.64
(Continued)

FOREIGN PATENT DOCUMENTS

CN    1674191 A    9/2005
CN    1951674 A    4/2007
(Continued)

OTHER PUBLICATIONS

International Search Report for PCT/EP2019/063598, dated Jul. 12, 2019.

*Primary Examiner* — Michael A Laflame, Jr.
(74) *Attorney, Agent, or Firm* — Norton Rose Fulbright US LLP; Gerard Messina (57) ABSTRACT

A method for connecting two components with the aid of a laser weld seam. The two components are situated one above the other in a joining area. The first component is pressed in the direction of the second component with the aid of a clamping device. A laser beam impacts the first component on the side facing away from the second component and at least indirectly fusing material of the two components.

16 Claims, 9 Drawing Sheets

(51) Int. Cl.
    *B23K 26/21*     (2014.01)
    *B23K 26/32*     (2014.01)
    *B23K 26/244*     (2014.01)
    *B23K 26/035*     (2014.01)
    *B23K 26/70*     (2014.01)
    *B23K 37/04*     (2006.01)
    *B23K 103/10*     (2006.01)
    *B23K 103/12*     (2006.01)
    *B23K 101/36*     (2006.01)

(52) U.S. Cl.
    CPC .......... *B23K 26/0869* (2013.01); *B23K 26/32* (2013.01); *B23K 26/702* (2015.10); *B23K 37/0435* (2013.01); *B23K 2101/36* (2018.08); *B23K 2103/10* (2018.08); *B23K 2103/12* (2018.08)

(58) Field of Classification Search
    CPC .... B23K 26/24–244; B23K 26/32–323; B23K 37/04–0408
    See application file for complete search history.

(56) References Cited

U.S. PATENT DOCUMENTS

| | | |
|---|---|---|
| 2016/0036009 A1 | 2/2016 | Cho et al. |
| 2018/0111226 A1 | 4/2018 | Wang et al. |
| 2018/0229332 A1* | 8/2018 | Tsai ................ B23K 26/22 |

FOREIGN PATENT DOCUMENTS

| | | |
|---|---|---|
| CN | 102598361 A | 7/2012 |
| CN | 104733421 A | 6/2015 |
| CN | 107405836 A | 11/2017 |
| CN | 107534119 A | 1/2018 |
| DE | 102008041774 A1 | 3/2010 |
| DE | 102010039893 A1 | 3/2012 |
| DE | 102015006421 A1 | 12/2015 |
| DE | 102016009553 A1 | 2/2017 |
| EP | 1674191 A2 | 6/2006 |
| JP | 2007149353 A | 6/2007 |
| JP | 2008027894 A | 2/2008 |
| JP | 2016030280 A | 3/2016 |
| WO | 2013160932 A1 | 10/2013 |

* cited by examiner

METHOD FOR CONNECTING TWO COMPONENTS AND COMPONENT COMPOSITE

FIELD

The present invention relates to a method for connecting two components with the aid of a laser weld seam. Furthermore, the present invention relates to a component composite which is manufactured according to a method according to the present invention and the use of a method according to the present invention.

BACKGROUND INFORMATION

German Patent Application No. DE 10 2008 041 774 A1 describes a method in which the two components are laid one on top of another in a joining area and the first component is pressed against the surface of the second component with the aid of an annular clamping device. A defined contact between the two components for welding is thus generated in the joining area, in which the two components are connected to one another by fusing the material of at least one component with the aid of a laser beam and subsequently solidifying the melt. With sufficiently flat and/or thick and/or rigid components, it is ensured by the pressing of the two components against one another outside the focus of the laser beam that a sufficiently large joining area or sufficient melt is generated which connects the two components to one another.

SUMMARY

An example embodiment of the present invention may have the advantage that, in particular, in the case of conductor supports having a relatively minor thickness as the first component, it enables a stable welding process, so that it is advantageously usable in particular in mass production technological applications. In this case, this means in particular applications in electronics, as in the manufacture of control units or the like, for example, in the automotive area, or in the manufacture of batteries made up of a large number of relatively thin layers, the layers having to be connected to one another.

In electronics, thin conductor supports in the form of flex foils or the like in the range of a few micrometers up to multiple tens of micrometers often have to be joined on a substrate (circuit board, stamped grating, etc.) having a typical thickness between 30 µm to 3000 µm. There are also applications in the manufacture of batteries, in which multiple battery foils of relatively minor thickness have to be joined as a stack and connected to one another. Copper typically is considered as the material for the initially mentioned (thin) conductor supports. During the joining or welding of such a thin conductor support to the substrate or another conductor support, the conductor support rests on the substrate or the second component preferably without gaps in order to achieve a stable process and a reliable connection between the two components. It could prove to be problematic that if a relatively thin foil or a relatively thin conductor support is used, it is heated by the laser beam and bulges in the direction away from the second component due to the thermal expansion. This could be promoted, in particular, by the minor thermal mass and the minor rigidity of the thin conductor support. A gap could thus result between the two components to be connected in the joining area, which may no longer be bridged by the melt formed. But even if melt may still bridge the gap, the connection often could not be manufactured reproducibly. Furthermore, it is to be noted that such variations with respect to the gap between the two components could also result in a variable heat input into the second component or into the substrate.

An example embodiment of the present invention provides that a first component having in particular a thickness in the joining area between 5 µm and 500 µm, preferably a thickness of less than 100 µm, and preferably a horizontal extension or width in a direction in the joining area between 0.5 mm and 20 mm is used, that the first component presses or applies force in a punctiform or linear manner against the second component on at least one point by the clamping device, that the two components and the laser beam are moved relative to each other to form a laser weld seam, and that the laser beam or the components is/are moved away from one point, at which the clamping device applies force to the first component against the second component, in the course of the welding process.

In summary, the present invention utilizes an effect, which is considered to be disadvantageous as such, of the thermal expansion of the first component advantageously in that by way of the mentioned clamping device or pressing device in conjunction with adapted process control, the properties of the first component are utilized insofar as the first component is only pressed or clamped in a punctiform manner against the second component and therefore only very locally. The welding process preferably starts very close to this pressing point, where it is ensured that the joining gap is almost zero or is significantly less than the foil thickness. Sufficient melt is thus available at the process start for connecting the two joining partners or components. Furthermore, due to the relative movement between the laser beam and the two components away from the pressing point, very rapid solidification of the melt in the welding spot is caused due to the high thermal conductivity of the materials, so that the first component is clamped against the second component due to the solidified melt itself. This has the advantage that the laser beam always finds a nearly gap-free joining situation between the two components during the further movement or during the fusing along the first component. In particular, due to the thermal expansion and due to the resulting warpage of the first component in advance of the laser weld seam, the first component always rests at the lower joining partner or the second component and provides a minor gap. This effect results because the first component, which is already solidly welded in a punctiform manner at the starting point, thermally expands and thus changes its length. Because the thermal expansion of the first component is not hindered by a clamping means, the length change or thermal expansion results in geometrical warpage of the foil or the first component which, in a first step, has the result that the foil or the first component drops and rests at the lower joining partner or the second component and thus closes the joining gap. During the cooling of the first component, for example behind the melt in the solidified weld area, the first component typically bulges upward due to the warpage which results upon cooling. This warpage is no longer relevant for the welding process, however. To advantageously use this described effect, it is particularly advantageous if the first component has a higher temperature on its upper side than on its lower side (in relation to the second component) and if the first component has a low rigidity. The preferred dimensions in accordance with an example embodiment of the present invention, i.e., the first component having in particular a thickness in the joining area between 5 µm and 500 µm, preferably a thickness of less than 100 μm, and preferably a horizontal extension or a width in the joining area between 0.5 mm and 20 mm, are to be understood against this background.

Advantageous refinements of the example method according to the present invention for connecting two components with the aid of a laser weld seam are described herein.

In addition to the mentioned thickness or width of the first component in the joining area, in particular the focus diameter of the laser beam may be an important parameter, since the heat input into the components is influenced thereby. If the focus diameter is too small or the first component is too wide or thick, for example, this means that the rigidity of the first component is relatively high, and the resulting thermal warpage of the first component is thus not sufficient, for example, to move the first component due to the thermal expansion in the direction toward the lower joining partner or the second component. Against this background, it has proven to be particularly advantageous if the focus diameter of the laser beam at the above-described dimensioning of the first component in the area of the first component is between 50 μm and 1000 μm, preferably between 200 μm and 600 μm.

In addition to the above-described focus diameter, of course, it may also be important to coordinate the welding feed or the welding speed and the laser power with the dimensioning of the first component in order to advantageously use the mentioned effect of the thermal expansion.

In addition, a method is particularly advantageous in which the laser beam, at least at the beginning of the welding process, has a wavelength in visible light, in particular a wavelength of less than 1000 nm, and the welding is carried out in heat conduction welding. In particular in conjunction with first components in which the material of the first component contains copper or aluminum and the wavelength is selected in the green or blue wavelength range, a particularly high level of absorption of the heat into the components thus results, in particular into the first component. This, in turn, has the result that in the scope of the so-called heat conduction welding, which is distinguished by low welding penetration depths, very little spatter results, which is considered to be particularly advantageous in particular in applications in electronics manufacturing. In contrast thereto, in the so-called deep welding process, in which relatively high welding penetration depths are generated, a welding process significantly more subject to spattering results. In conjunction with the relatively large mentioned focus diameter and the mentioned wavelength in green or blue visible light, the absorption of heat into the components is therefore optimized or increased. In contrast thereto, for example, in the case of infrared lasers, which are typically distinguished by a wavelength of greater than 1000 nm, small focus diameters have to be used due to the low absorption in order to achieve the required intensity for the welding process. This small focus diameter in turn results in the deep welding method mentioned or a welding process subject to spattering, however.

The present invention is not to be limited to the thermal conduction welding mentioned, however. Rather, it is also possible that after a part of the weld seam is formed in heat conduction welding by the laser beam, a deep welding process is carried out. This change from heat conduction welding to the deep welding process may be promoted, for example, by so-called ramping up of the laser power or by a process-adapted power distribution over the weld seam length. For this purpose, it is provided that the laser power is varied over time during the course of the process, in particular is increased. The process control may thus also be positively influenced, in particular if heat accumulation in the first component occurs. It is also possible that the laser power is adapted or modulated over the course of the process so that a change is made multiple times between heat conduction welding and deep welding. This may take place, for example, due to a sinusoidal power curve (or a differently formed power curve) for the laser beam.

A further preferred method provides that prior to the relative movement between the laser beam and the components, the laser beam acts in a stationary manner on the components for a certain period at the beginning of the welding process. It is thus ensured that initially a punctiform welded connection is created, and this area is also already preheated by the heat input in the direction of the weld seam still to be generated. Overall, a homogeneous weld seam may thus be achieved.

In particular, to achieve a homogeneous weld seam, it may also be provided that the feed speed or the relative speed of the laser beam to the components is varied during the welding process. It is thus optionally possible, for example, to increase the welding speed in the course of the welding process, since due to the welding which is already been generated, an increasing heat input into the components also takes place in the areas in which the weld seam is subsequently to be generated.

A further example embodiment of the method according to the present invention provides that the focus diameter of the laser beam is varied during the welding process. This may be carried out, for example, using a corresponding laser optical unit. For example, it may be particularly advantageous to start the welding process using a small focus diameter in order to thus achieve a higher energy density or better coupling conditions into the components, and then to enlarge the focus diameter to achieve larger seam cross sections along the weld seam.

The generation of a weld seam may either be carried out by a laser beam acting continuously on the components or by pulsed (individual) spot welds, which partially overlap, for example. In the case of the generation of spot welds or the pulsed process, the pulse shape is to be adapted accordingly so that the first component rests at the lower joining partner or the second component due to the thermal expansion and the spot weld and the fusion are then generated. The spatial distance of the individual pulses and the time interval of the pulses are to be adapted accordingly to the geometrical conditions of the two components.

In general, it is possible that after the formation of a first spot weld or a first partial weld seam between the two components, the clamping device may be removed, since the weld seam already generated or the spot weld already generated functions as the clamping means between the components and holds the first component at its position.

The shape of the weld seams may also be selected in a variety of ways, depending on the application. In a first specific embodiment, it may be provided that the laser weld seam is formed from multiple partial weld seams which overlap at least in one point. Alternatively, it is also possible that the laser weld seam is formed from multiple partial weld seams which are preferably situated along a line, a weld-free area or a distance being formed between two adjacent partial weld seams. Furthermore, to form a laser weld seam, it may be provided that spot weld connections are generated beforehand along the laser weld seam to be formed. This may be used advantageously in particular if longer weld seams are to be formed. This is because otherwise so-called seam interruptions may take place due to process variations along the weld seam, and the self-fixing of the first component provided according to the present invention by the existing and solidified weld seam is lost. To reduce this effect of the seam interruptions in longer weld seams, the spot weld strategy or tack weld strategy mentioned is applied. Local small tack welds or spot welds are placed and the weld seam is divided into segments, each partial segment always starting on one of the spot welds. It is thus ensured that seam breaks, if they happen to occur locally, only influence a part of the particular seam segment.

Furthermore, the present invention includes a component composite which was manufactured according to a method according to the present invention as described herein. This component composite is distinguished in that the first component is a conductor support in the form of a flex foil or the like or a battery layer and the second component is a substrate or a battery foil.

Further advantages, features, and details of the present invention result from the following description of preferred exemplary embodiments and on the basis of the figures.

DETAILED DESCRIPTION OF EXAMPLE EMBODIMENTS

Identical elements or elements with identical functions are provided with the same reference numerals in the figures.

Figure 1:
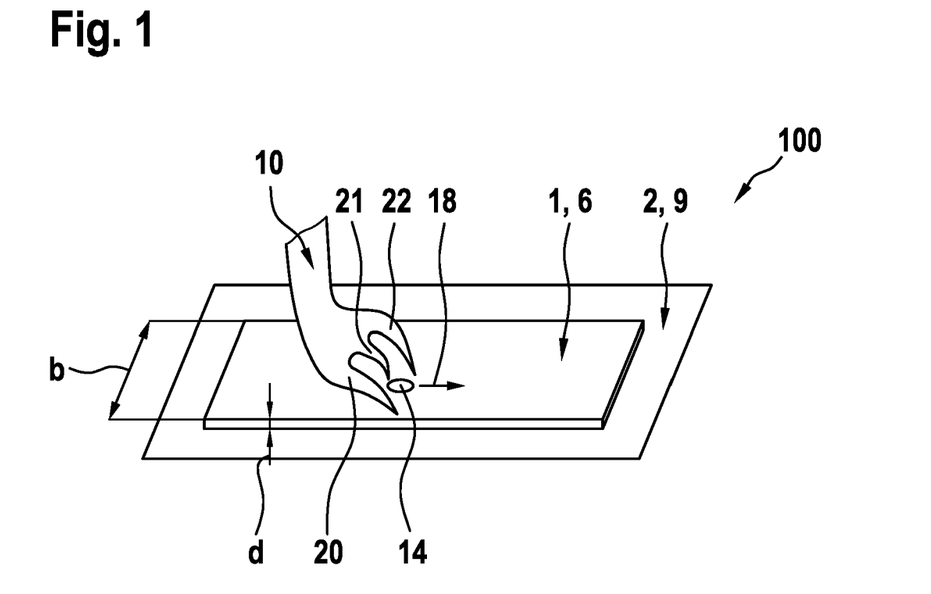
FIG. 1 through FIG. 3 each show a perspective representation of differently designed clamping devices for clamping a first foil-like component against the upper side of a second component, in accordance with example embodiments of the present invention.
Figure 2:
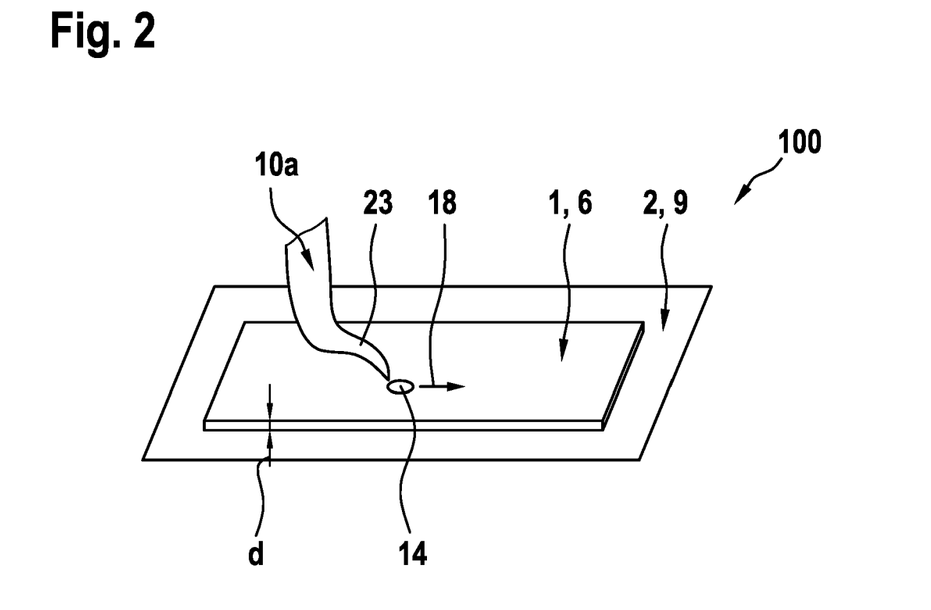
Figure 3:
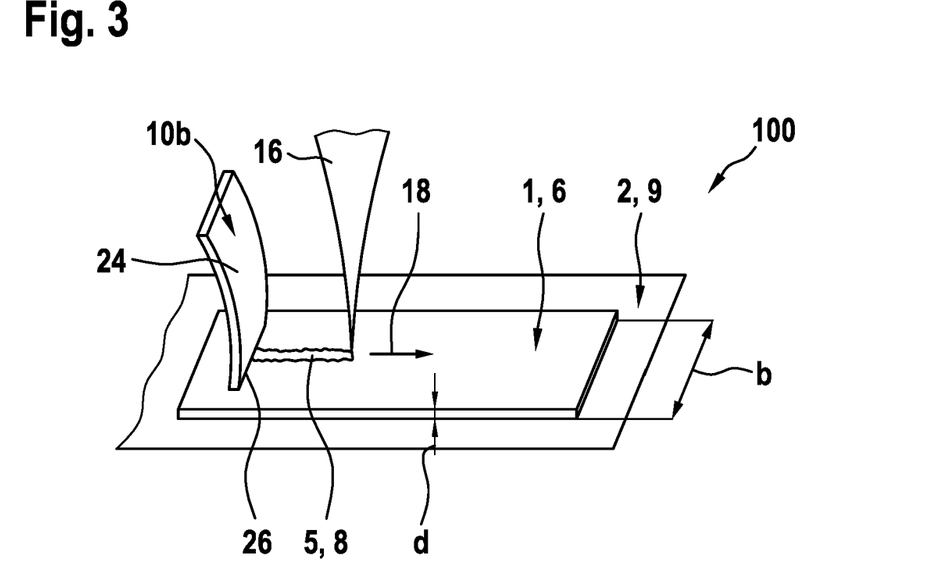

A component composite 100 made up of two components 1, 2 is shown in each of FIGS. 1 through 3, which is formed by forming a laser weld seam 5, which is only completely shown in FIG. 3, by connecting the two components 1, 2. First component 1 is, for example, a foil 6 which is made up of an electrically conductive material, i.e., for example, copper, aluminum, gold, silver, or contains similar. Furthermore, first component 1 or foil 6 has a relatively low rigidity. Thickness d between 5 µm and 500 µm, preferably a thickness d of less than 100 µm of the foil 6 contributes to this at least in joining area 8, i.e. in the area of laser weld seam 5, in which the two components 1, 2 are connected with the aid of laser weld seam 5. furthermore, foil 6 has a width b between 0.5 mm and 20 mm in a horizontally extending plane in an extension direction perpendicular to the longitudinal direction of laser weld seam 5.

Second component 2 is, by way of example and non-restrictively, a substrate 9 such as a circuit board, a ceramic substrate having conductor structures, or the like. Furthermore, second component 2 typically includes a metal coating (not shown in the figures) on the upper side facing toward first component 1. The formation of laser weld seam 5 causes a fusion of both first component 1 and second component 2 on the side facing toward first component 1 while forming a melt 12. After the solidification of melt 12, it forms laser weld seam 5.

A starting point 14 of laser beam 16 shown in FIG. 3 is shown in FIGS. 1 and 2, at which laser beam 16 is positioned at the beginning of the welding process to the two components 1, 2. It is apparent in FIG. 3 that laser weld seam 5 is formed, for example, as an elongated laser weld seam 5, which extends starting from starting point 14 in the direction of arrow 18. For this purpose, it is provided that the composite made up of the two components 1, 2 is moved relative to laser beam 16. This may be carried out either by a relative movement of the two components 1, 2 to a stationary aligned laser beam 16, or preferably by a movement of laser beam 16 along the surface of the two components 1, 2 by way of a corresponding laser optical unit or the like.

To ensure that the spacing between the two components 1, 2 is sufficiently small in the area of starting point 14 at the beginning of the laser beam welding process that during the formation of melt 12, material of second component 2 is also fused or provided in liquid form, a clamping device 10, 10a, 10b shown in sections in FIGS. 1 through 3 is used. In the specific embodiment according to FIG. 1, clamping device 10 includes three finger-like elements 20 through 22 on the side facing toward first component 1, which have the same spacing to the surface of component 1, so that with the aid of clamping device 10, first component 1 or foil 6 is pressed or has force applied to it, in the area of elements 20 through 22, against the surface of (preferably flat) component 2. In addition, it is to be noted that for the exact positioning of clamping device 10, 10a, 10b, it is movably situated in a way which is not shown in the three spatial axes relative to components 1 and 2.

In the arrangement of elements 20 through 22 of clamping device 10 at starting point 14 of laser beam 16, the spacing or the horizontal distance of the contact points of elements 20 through 22 on first component 1 or foil 6 is relatively small in relation to starting point 14, so that it is ensured that in the area of starting point 14, first component 1 rests on second component 2 or such a small gap is formed that upon fusion of the material of first component 1, melt 12 or laser beam 16 becomes operationally connected to the surface of second component 2 to also melt-on or fuse it in certain areas.

In FIG. 2, clamping device 10a only has a single element 23, which is designed in principle corresponding to elements 20 through 22 of clamping device 10.

Clamping device 10b shown in FIG. 3, in contrast, includes a plate-shaped element 24, which forms a linear contact area 26 on first component 1 or foil 6 on the side facing toward first component 1.

In the laser welding process, the movement of laser beam 16 relative to components 1, 2, starting from starting point 14, takes place in a direction facing away from elements 20 through 24, which is to be illustrated in each of FIGS. 1 through 3 by arrow 18.

Figure 4:
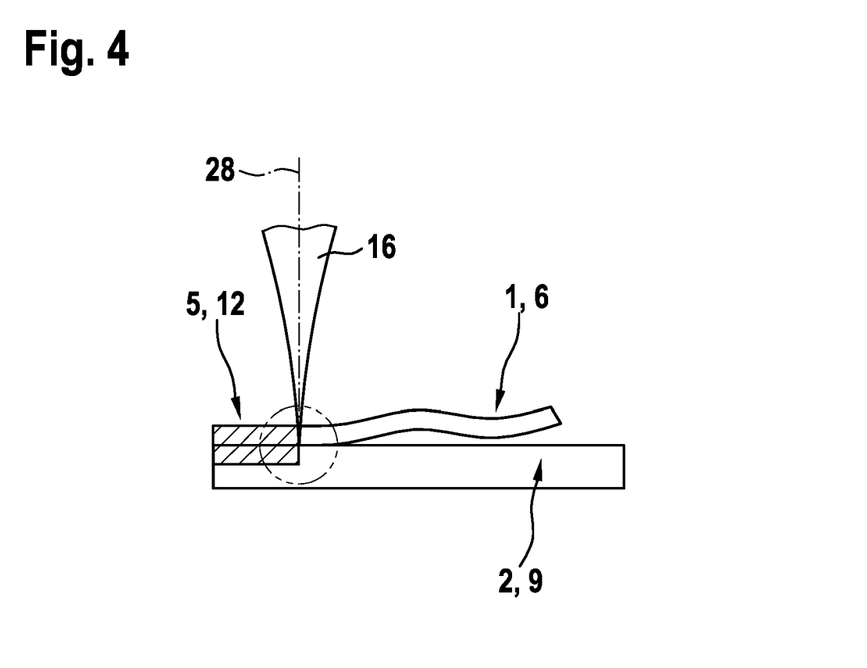
FIG. 4 shows a longitudinal section during the formation of a laser weld seam, in accordance with an example embodiment of the present invention.
Figure 5:
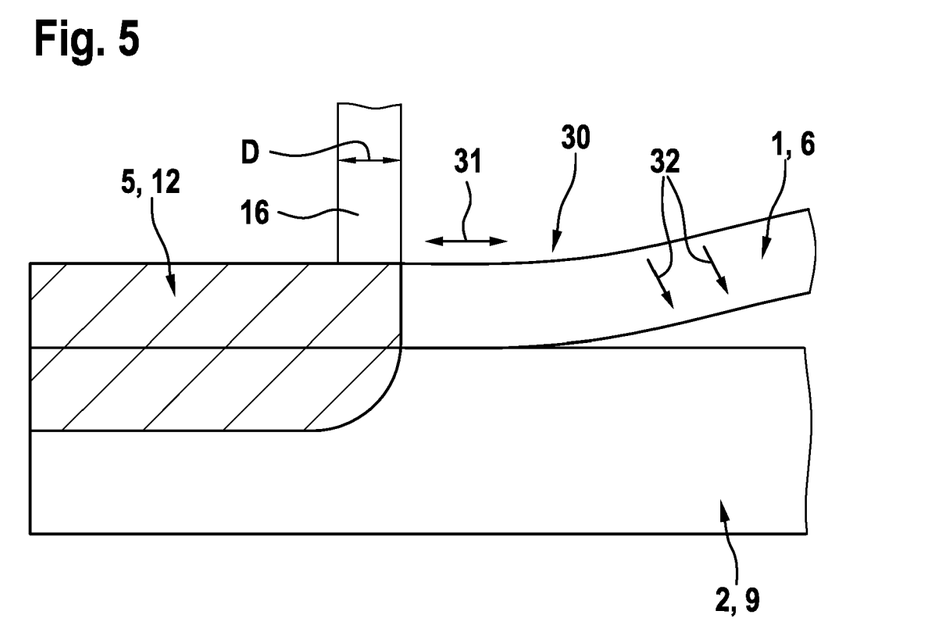
FIG. 5 shows a detail of FIG. 4 in an enlarged representation.
Figure 6:
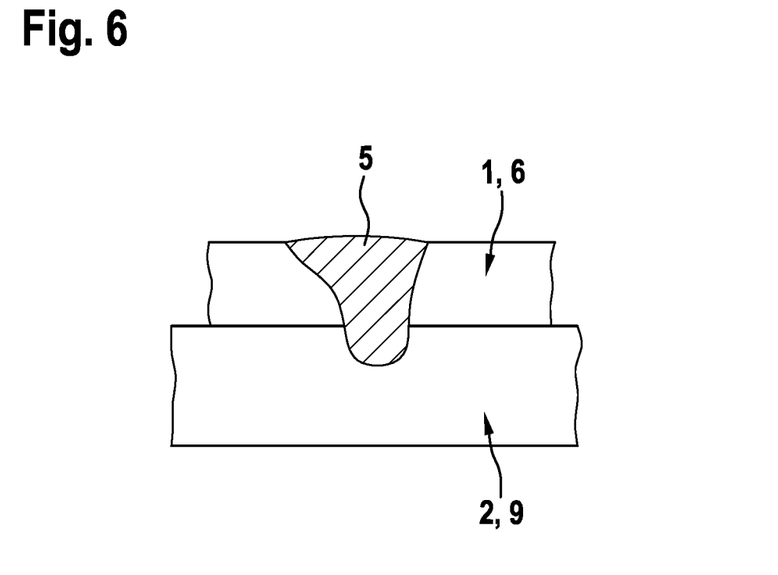
FIG. 6 shows a cross section through the area of the laser weld seam according to FIGS. 4 and 5.

Laser weld seam 5 is shown in greater detail during the welding process in FIGS. 4 through 6. In particular, it is apparent in FIG. 4 that a longitudinal axis 28 of laser beam 16 extends perpendicularly to the surface of the two components 1, 2. Furthermore, a focus diameter D of laser beam 16 is apparent on the basis of FIG. 5, which, in the area of the surface of first component 1 or foil 6, is between 50 μm and 1000 μm, preferably between 200 μm and 600 μm.

In addition, as is shown in FIG. 5, in an area 30, in which the two components 1, 2 are not yet welded to one another, upper component 1 or foil 6 is thermally expanded by laser beam 16 due to the heat input, which has the result that the material of first component 1 or foil 6 moves in the direction of the surface of second component 2, which is to be illustrated by arrows 31 and 32. This effect may be explained in particular in that the temperature at the upper side of first component 1 or foil 6, i.e., on the side facing away from second component 2, is higher than on the side facing toward second component 2. In addition, it is shown in FIG. 6 that the material of second component 2 has been melted and solidified in areas to form laser weld seam 5.

Figure 7:
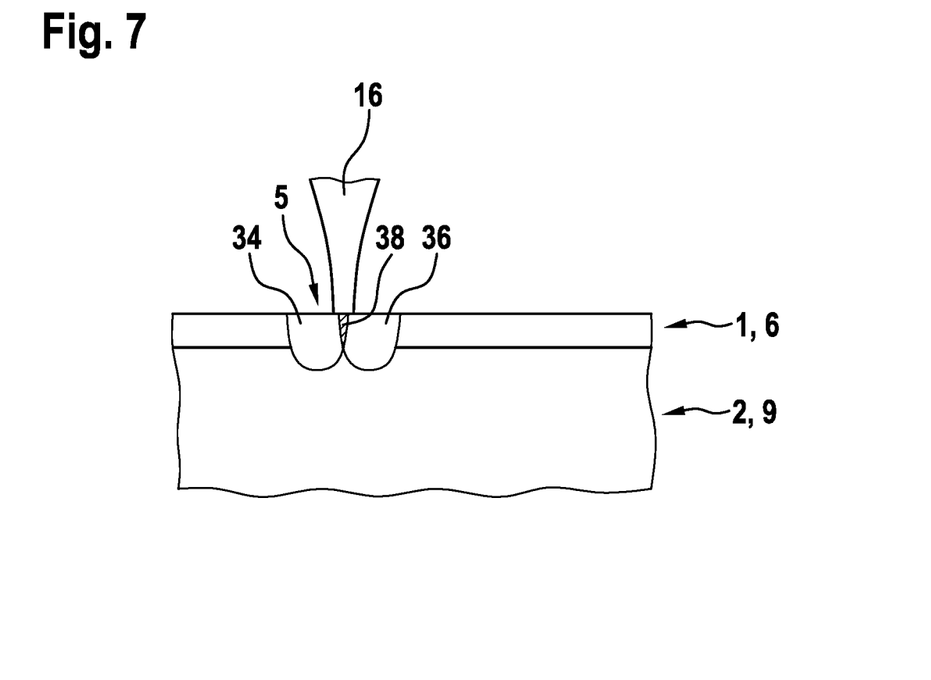
FIG. 7 shows a longitudinal section through a laser weld seam generated from multiple individual spot welds, in accordance with an example embodiment of the present invention.

FIG. 7 shows that it is also possible to use a pulsed laser beam 16 instead of a continuous laser beam 16 to form laser weld seam 5. Two spot welds 34, 36 are generated, which are situated adjacent to one another in the horizontal direction, preferably in such a way that an overlapping area 38 is created, which connects the two spot welds 34, 36 to one another. An elongated continuous laser weld seam 5 may thus be generated by a corresponding number of spot weld connections or spot welds 34, 36.

In addition, it is to be noted that in contrast to the classical pulse welding just described, a pulsed laser beam 16 (within its typical pulse duration between 1 ms and 50 ms) may generate a weld seam by relative movement to components 1, 2.

Figure 8:
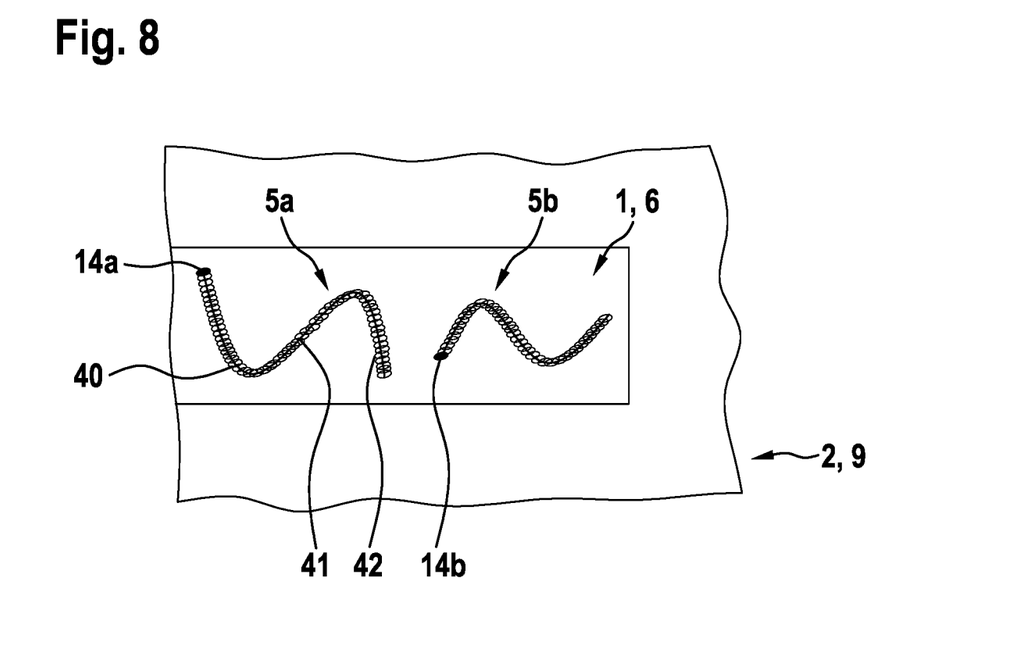
FIG. 8 through FIG. 12 each show differently formed laser weld seams in a top view, in accordance with example embodiments of the present invention.

Different arrangements or shapes of weld seams are shown in FIGS. 8 through 12. In FIG. 8, two laser weld seams 5a, 5b, which are situated locally separated from one another, are used to connect the two components 1, 2. Furthermore, the two laser weld seams 5a and 5b are distinguished by starting points 14a, 14b. While laser weld seam 5a is made up of three approximately linear subsections 40 through 42, laser weld seam 5b is designed in waveform.

Figure 9:
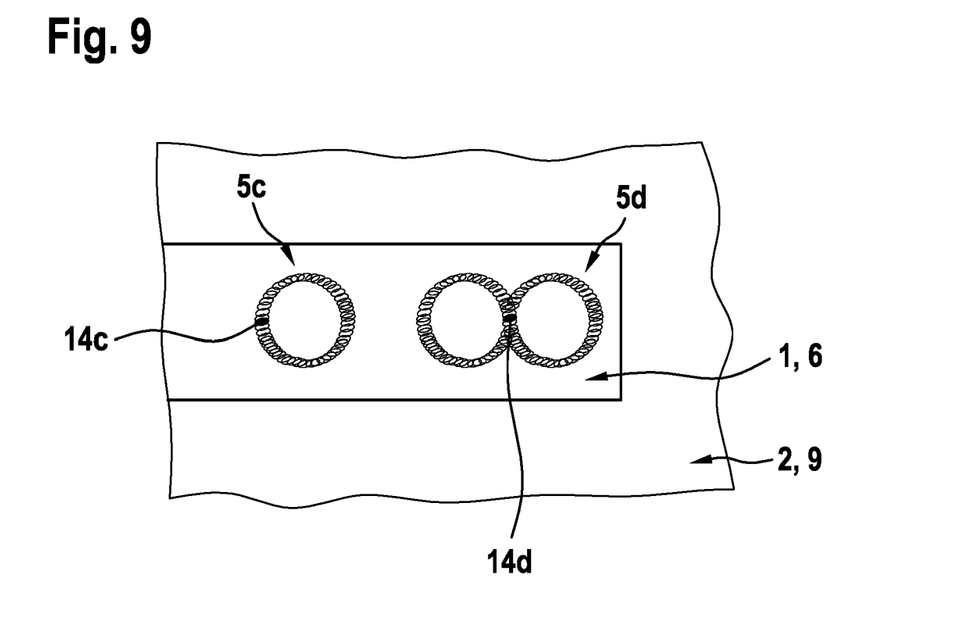

Two laser weld seams 5c, 5d each having a starting point 14c, 14d are also generated in FIG. 9. While laser weld seam 5c is designed to be circular, laser weld seam 5d is designed in the shape of a horizontal figure eight, starting point 14d being in the intersection point of the two circular subelements.

Figure 10:
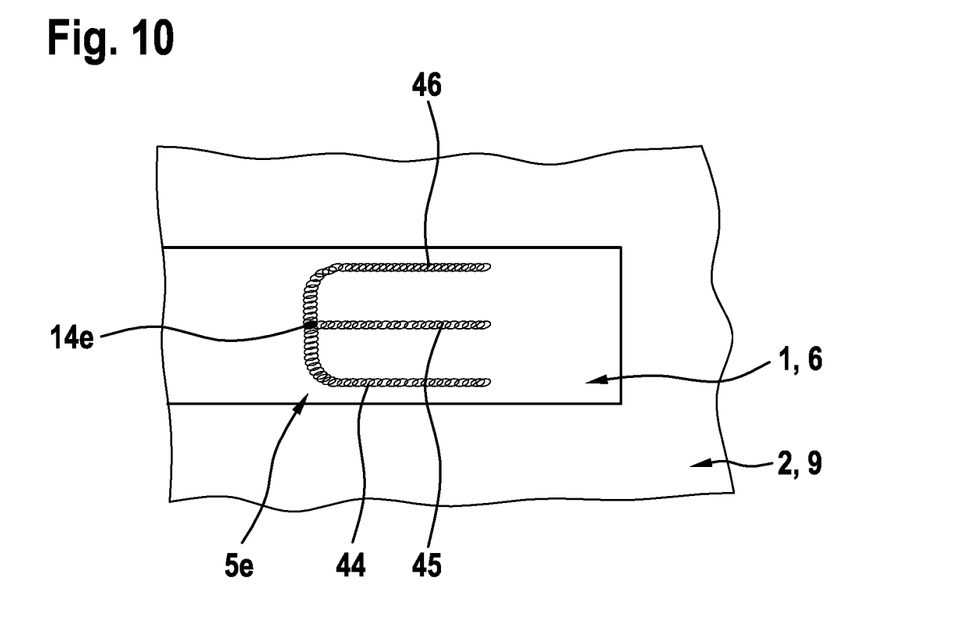

A laser weld seam 5e including a starting point 14e, which is designed in the shape of an "E," is shown in FIG. 10. Laser weld seam 5e includes three sections 44 through 46, which are each generated from a shared starting point 14e.

Figure 11:
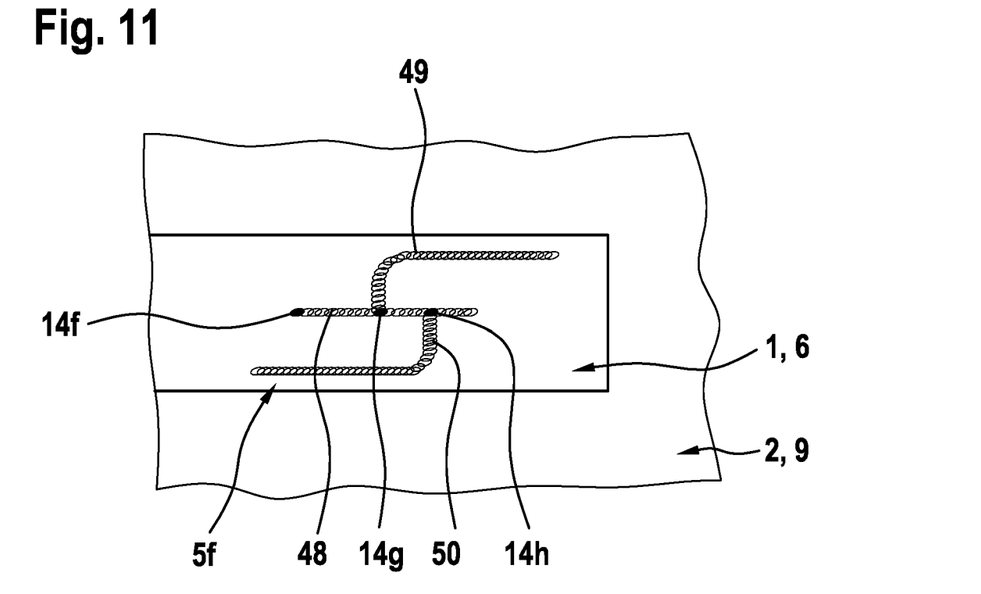

Laser weld seam 5f shown in FIG. 11 is also made up of three sections 48 through 50 each including a starting point 14f, 14g, 14h, which are situated separately from one another. While section 48 is designed to be linear and is generated, for example, as first section 48 from starting point 14f, second section 49 is formed starting from starting point 14g. Lastly, third section 50 is generated from starting point 14h.

Figure 12:
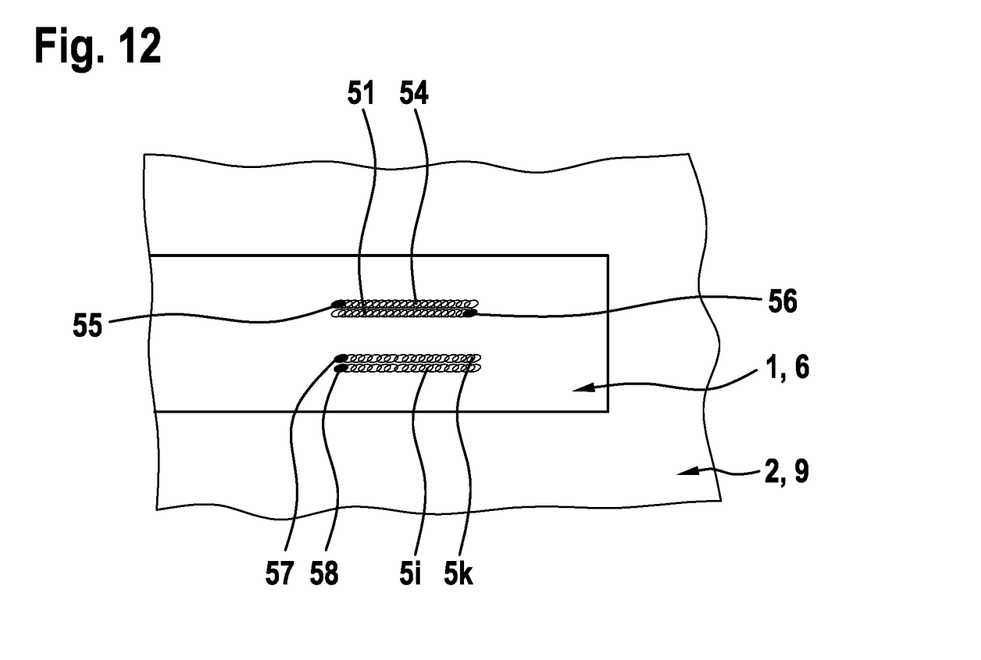

A total of four laser weld seams 5h through 5k are shown in FIG. 12, which extend in parallel to one another and each have the same length or extension in their main extension direction. A relatively small spacing to one another is formed in each case between the two laser weld seams 5h and 5i and also 5j and 5k. While the two laser weld seams 5h and 5i are each generated from starting points 55 and 56 arranged diametrically opposite, the two starting points 57 and 58 of the two weld seams 5j and 5k are located directly adjacent to one another on a shared side.

Figure 13:
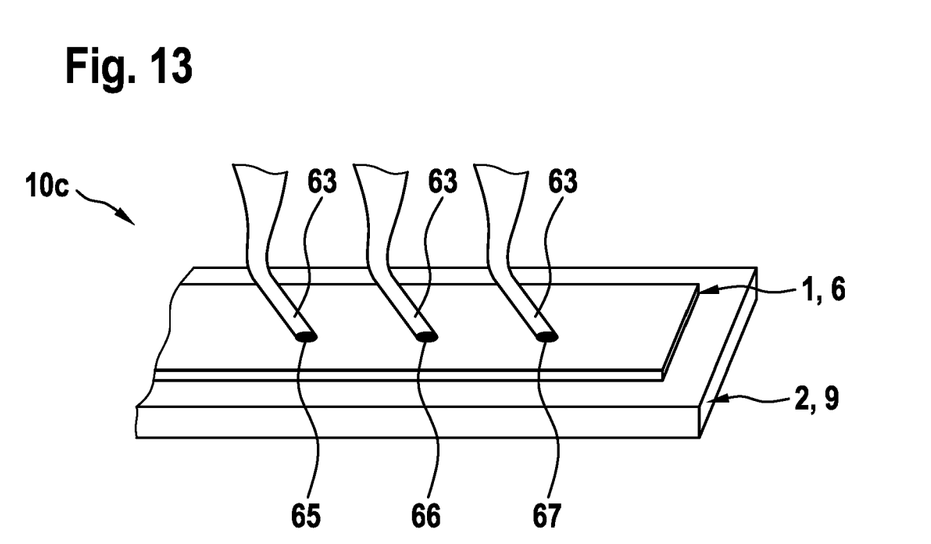
FIG. 13 and FIG. 14 each show a top view of the formation of a laser weld seam formed from multiple partial weld seams, in accordance with example embodiments of the present invention.
Figure 14:
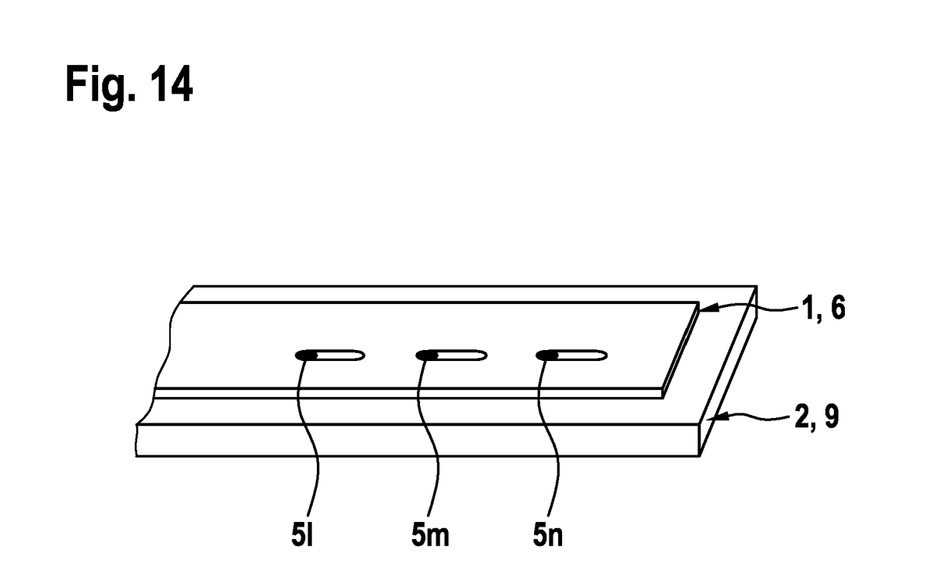

An exemplary embodiment is shown in FIGS. 13 and 14 in which according to FIG. 14, three laser weld seams 5l, 5m, and 5n are used to form laser weld seam 5, which are situated flush along an imaginary line to one another, an area without welding being formed in each case between laser weld seams 5l and 5m and also 5m and 5n. The three laser weld seams 5l through 5n are generated from a starting point 65 through 67, a clamping device 10c being able to be used according to FIG. 13, which includes, for example, three finger-like elements 63 corresponding to clamping device 10a of FIG. 2.

Figure 15:
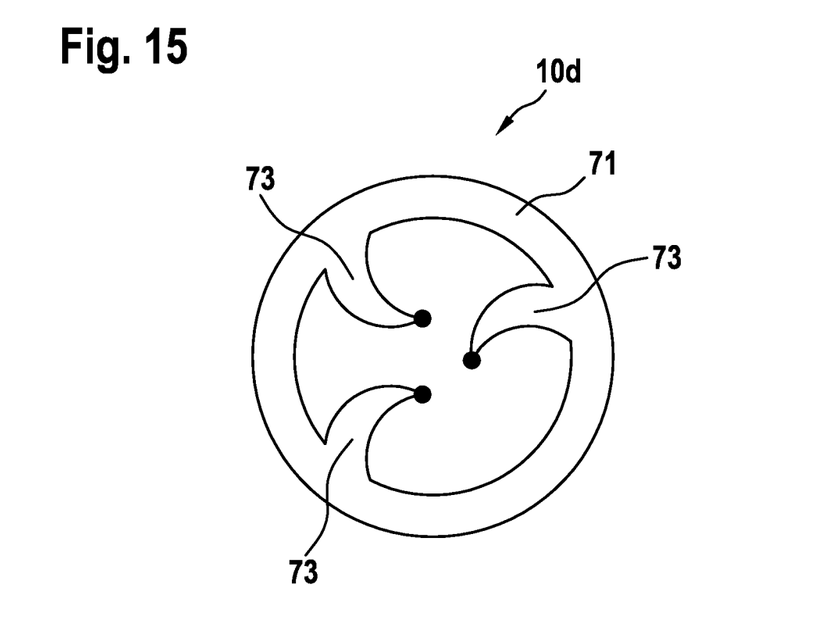
FIG. 15 shows a top view of a modified clamping device, in accordance with an example embodiment of the present invention.
Figure 16:
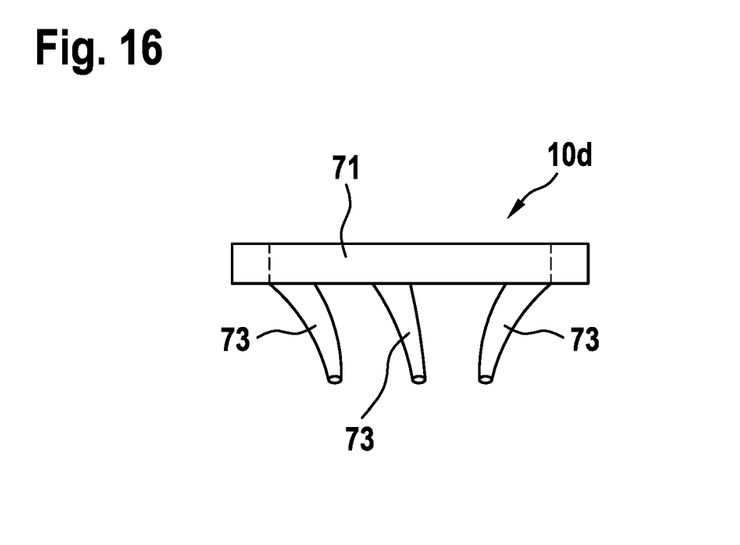
FIG. 16 shows a side view of the clamping device according to FIG. 15.
Figure 17:
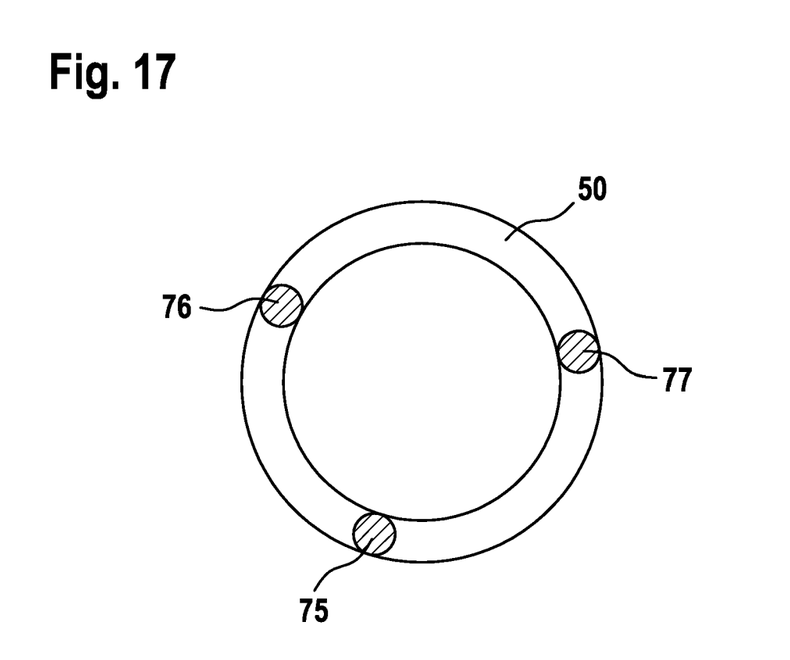
FIG. 17 shows a circular weld seam generated with the aid of the clamping device according to FIGS. 15 and 16 in a top view.

A laser weld seam 5o designed to be round in a top view is shown in FIG. 17, which is generated with the aid of a clamping device 10d which is apparent in FIGS. 15 and 16. Clamping device 10d includes an annular external body 71, from which three elements 73 protrude radially inward, which are designed to be brought into contact with first component 1 (not shown). Close to the starting point of elements 73 on first component 1 or foil 6, a tack of first component 1 on second component 2 in the area of spot welds 75 through 77 takes place corresponding to the illustration of FIG. 17.

The example methods described above for forming component composite 100 between the two components 1 and 2 and component composite 100 may be altered and modified in a variety of ways without departing from the scope of the present invention.

What is claimed is:

1. A method for connecting two components, the method comprising the following steps:
situating the two components one above the other in a joining area;
applying a clamping force to a point of a first component of the two components in a direction of a second component of the two components by impacting the point of the first component with an object surface; and
generating a laser weld seam by impacting a laser beam on the first component on a side facing away from the second component to at least indirectly fuse material of the two components;
wherein:
the first component has a thickness in a joining area between 5 μm and 500 μm;
the impacting of the laser beam begins at the point at which the clamping force is applied and the impacting of the laser beam continues in a line away from the point at which the clamping force is applied, without the clamping force being externally applied along the line other than at the point; and
the impacting of the laser beam continuing in the line is effected by the laser beam being moved relative to the two components.

2. The method as recited in claim 1, wherein:
the thickness of the first component in the joining area is less than 100 μm;
a horizontal extension or a width of in the joining area is between 0.5 mm and 20 mm; and
a focus diameter of the laser beam in an area of the first component is between 50 μm and 1000 μm.

3. The method as recited in claim 1, wherein a focus diameter of the laser beam in an area of the first component is between 50 μm and 1000 μm.

4. The method as recited in claim 3, wherein the focus diameter is between 200 μm and 600 μm.

5. The method as recited in claim 1, wherein the laser beam has a wavelength in visible light, the wavelength being less than 1000 nm, at least at the beginning of the welding process, and the welding is carried out by heat conduction welding.

6. The method as recited in claim 5, wherein the first component includes copper, or aluminum, or silver, or gold, and the wavelength of the laser beam is in a green or blue wavelength range.

7. The method as recited in claim 5, wherein after formation of a part of the laser weld seam by heat conduction welding, the wavelength of the laser beam is changed to be above 1000 nm to carry out a deep welding process.

8. The method as recited in claim 7, wherein laser power of the laser beam varies over time over the course of the welding process, the laser power being increased over time.

9. The method as recited in claim 1, wherein prior to movement of the laser beam relative to the two components, the laser beam acts in a stationary manner for a certain period on the two components at a beginning of the welding process.

10. The method as recited in claim 1, wherein a relative speed between the laser beam and the two components is varied during the welding process.

11. The method as recited in claim 1, wherein a focus diameter of the laser beam is varied during the welding process.

12. The method as recited in claim 1, wherein the laser weld seam is generated by pulsed spot welds, which partially overlap.

13. The method as recited in claim 1, wherein the laser weld seam includes a plurality of independent seam sections that extend in different direction and that overlap one another at at least in one point.

14. The method as recited in claim 1, wherein the laser weld seam is one of a plurality of partial weld seams situated along the line, a spacing being formed between two adjacent ones of the partial weld seams.

15. The method as recited in claim 1, wherein prior to formation of the laser weld seam, spot welds are generated beforehand in an area of the laser weld seam to be formed.

16. A component composite, the component composite manufactured by connecting two components using a laser weld seam by:
situating the two components one above the other in a joining area;
applying a clamping force to a point of a first component of the two components in a direction of a second component of the two components by impacting the point of the first component with an object surface; and
generating a laser weld seam by impacting a laser beam on the first component on a side facing away from the second component to at least indirectly fuse material of the two components;
wherein:
the first component has a thickness in a joining area between 5 μm and 500 μm;
the impacting of the laser beam begins at the point at which the clamping force is applied and the impacting of the laser beam continues in a line away from the point at which the clamping force is applied, without the clamping force being externally applied along the line other than at the point;
the impacting of the laser beam continuing in the line is effected by the laser beam being moved relative to the two components and
the first component is a conductor support in the form of a flex foil or a battery layer and the second component is a substrate or a battery foil.

* * * * *